(12) United States Patent
Yang et al.

(10) Patent No.: US 10,910,161 B2
(45) Date of Patent: Feb. 2, 2021

(54) CAPACITOR COMPONENT

(71) Applicant: SAMSUNG ELECTRO-MECHANICS CO., LTD., Suwon-si (KR)

(72) Inventors: Jeong Suong Yang, Suwon-si (KR); Woong Do Jung, Su-won-si (KR); Bon Seok Koo, Su-won-si (KR); Jong Suk Han, Su-won-si (KR); Sung Min Cho, Su-won-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 1 day.

(21) Appl. No.: 16/291,053

(22) Filed: Mar. 4, 2019

(65) Prior Publication Data

US 2019/0385795 A1    Dec. 19, 2019

(30) Foreign Application Priority Data

Jun. 15, 2018  (KR) .................. 10-2018-0068835
Aug. 22, 2018  (KR) .................. 10-2018-0098187

(51) Int. Cl.
*H01G 4/224* (2006.01)
*H01G 4/30* (2006.01)
*H01G 4/232* (2006.01)
*H01G 4/12* (2006.01)

(52) U.S. Cl.
CPC ............ *H01G 4/224* (2013.01); *H01G 4/2325* (2013.01); *H01G 4/30* (2013.01); *H01G 4/1227* (2013.01)

(58) Field of Classification Search
CPC ........ H01G 4/248; H01G 4/012; H01G 4/1209; H01G 4/232; H01G 4/30; H01G 4/0085; H01G 4/1227; H01G 4/2325; H01G 4/224

See application file for complete search history.

(56) References Cited

U.S. PATENT DOCUMENTS

| 9,653,211 | B2 | 5/2017 | Kisumi et al. |
| 9,758,695 | B2 | 9/2017 | Hong et al. |
| 2015/0287532 | A1* | 10/2015 | Abe ............... H01G 4/2325 174/260 |

(Continued)

FOREIGN PATENT DOCUMENTS

| JP | 2000-164406 A | 6/2000 |
| KR | 10-0204255 B1 | 6/1999 |

(Continued)

OTHER PUBLICATIONS

Office Action issued in corresponding Korean Patent Application No. 10-2018-0098187 dated Nov. 21, 2019, with English translation.

*Primary Examiner* — Michael P McFadden
(74) *Attorney, Agent, or Firm* — Morgan, Lewis & Bockius LLP (57) ABSTRACT

A capacitor component includes a humidity resistant layer formed on a portion of the external surface of a body on which an external electrode is not formed, and further includes a humidity resistant layer disposed inside the external electrode, to improve humidity resistance reliability. The capacitor component includes an opening portion formed by removing a portion of the humidity resistant layer disposed inside the external electrode to improve electrical connection.

24 Claims, 10 Drawing Sheets

(56) References Cited

U.S. PATENT DOCUMENTS

2016/0039711 A1* 2/2016 Miyazaki .................. C03C 4/14
361/301.4
2016/0351332 A1   12/2016 Lee et al.
2018/0166215 A1*  6/2018 Hamanaka ............. H01G 4/232

FOREIGN PATENT DOCUMENTS

| KR | 10-2016-0064260 A | 6/2016 |
| KR | 10-2016-0139932 A | 12/2016 |
| KR | 10-1703195 B1 | 2/2017 |

* cited by examiner

CAPACITOR COMPONENT

CROSS-REFERENCE TO RELATED APPLICATIONS

This application claims the benefit of priority to Korean Patent Applications No. 10-2018-0068835 filed on Jun. 15, 2018, and No. 10-2018-0098187 filed on Aug. 22, 2018 in the Korean Intellectual Property Office, the disclosures of which are incorporated herein by reference in their entireties.

BACKGROUND

1. Field

The present disclosure relates to a capacitor component.

2. Description of Related Art

A multilayer ceramic capacitor (MLCC) is a type of capacitor component and is an important chip component used in industrial areas relating to communications, computing, home appliances, automobiles, and the like, due to advantages thereof such as compactness, guaranteed high capacitance, and desirable mountability. In particular, an MLCC is a core passive component used in various electric, electronic, and information communications devices such as mobile phones, computers, digital televisions (TVs), and the like.

Along with the recent trend for electronic devices to have a more compact size and higher performance, it is becoming more important to secure reliability, including humidity resistance reliability in particular, of capacitor components.

Further, as the development of electric cars, self-driving cars, and the like, is underway in the automobile industries, there has been demand for an increasing number of MLCCs. Furthermore, the MLCCs used in cars and the like, are required to endure severe reliability conditions.

SUMMARY

An aspect of the present disclosure is to provide a capacitor component having excellent humidity resistance reliability.

According to an aspect of the present disclosure, a capacitor component includes a body including dielectric layers and first and second internal electrodes alternately disposed with the dielectric layers interposed therebetween, and having first and second surfaces opposing each other, third and fourth surfaces connected to the first and second surfaces and opposing each other, and fifth and sixth surfaces connected to the first to fourth surfaces and opposing each other. A first electrode layer includes a first connection portion disposed on the third surface of the body and a first band portion extending onto portions of the first, second, fifth, and sixth surfaces from the first connection portion. A second electrode layer includes a second connection portion disposed on the fourth surface of the body and a second band portion extending onto portions of the first, second, fifth, and sixth surfaces of the body from the second connection portion. First and second humidity resistant layers are disposed on the first and second electrode layers, respectively, and include opening portions formed on the first and second connection portions, respectively. A third humidity resistant layer is disposed on the first, second, fifth, and sixth surfaces of the body and is connected to the first and second humidity resistant layers. First and second connection electrode layers are disposed on the first and second humidity resistant layers, respectively, and are disposed in contact with the first and second electrode layers, respectively, through the opening portions.

According to another aspect of the present disclosure, a capacitor component includes a body including dielectric layers and first and second internal electrodes alternately disposed with the dielectric layers interposed therebetween, and having first and second surfaces opposing each other, third and fourth surfaces connected to the first and second surfaces and opposing each other, and fifth and sixth surfaces connected to the first to fourth surfaces and opposing each other. A first electrode layer includes a first connection portion disposed on the third surface of the body and a first band portion extending onto portions of the first, second, fifth, and sixth surfaces of the body from the first connection portion. A second electrode layer includes a second connection portion on the fourth surface of the body and a second band portion extending onto portions of the first, second, fifth, and sixth surfaces from the second connection portion. First and second humidity resistant layers are disposed on the first and second electrode layers, respectively, and include opening portions formed on the first and second connection portions, respectively. A third humidity resistant layer is disposed on the first, second, fifth, and sixth surfaces of the body, and is connected to the first and second humidity resistant layers. First and second connection electrode layers are disposed on the first and second humidity resistant layers, respectively, and are disposed in contact with the first and second electrode layers, respectively, through the opening portions.

According to a further aspect of the present disclosure, a capacitor component includes a body including dielectric layers and first and second internal electrodes alternately disposed with the dielectric layers interposed therebetween, wherein the first and second internal electrodes are exposed to opposing first and second surfaces of the body, respectively. A first electrode layer includes a first connection portion disposed on the first surface of the body, and a first band portion extending from the first connection portion onto portions of side surfaces of the body. A second electrode layer includes a second connection portion disposed on the second surface of the body, and a second band portion extending from the second connection portion onto portions of the side surfaces of the body. A first humidity resistant layer is disposed on the first electrode layer and has one or more opening portions disposed in only one from among the first connection portion and the first band portion. A second humidity resistant layer is disposed on the second electrode layer and has one or more opening portions disposed in only one from among the second connection portion and the second band portion. First and second connection electrode layers are disposed on the first and second humidity resistant layers, respectively, and are disposed in contact with the first and second electrode layers, respectively, through the opening portions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments in the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the present disclosure to those skilled in the art. In the drawings, the shapes and dimensions of elements may be exaggerated for clarity, and the same reference numerals will be used throughout to designate the same or like components.

Also, elements having the same function within a scope of the same concept illustrated in drawings of respective embodiments will be described by using the same reference numerals. Terms used in the present specification are for explaining the embodiments rather than limiting the present invention. Unless explicitly described to the contrary, a singular form includes a plural form in the present specification. The words "comprise" and "include", and variations such as "comprises" or "comprising", and "includes" or "including", will be understood to imply the inclusion of stated constituents, steps, operations, and/or elements but not the exclusion of any other constituents, steps, operations, and/or elements.

In the drawings, without being limited thereto, an X direction may be defined as a first direction or a length direction, a Y direction as a second direction or a width direction, and a Z direction as a third direction, a thickness direction, or a lamination direction.

Capacitor Component

Figure 1:
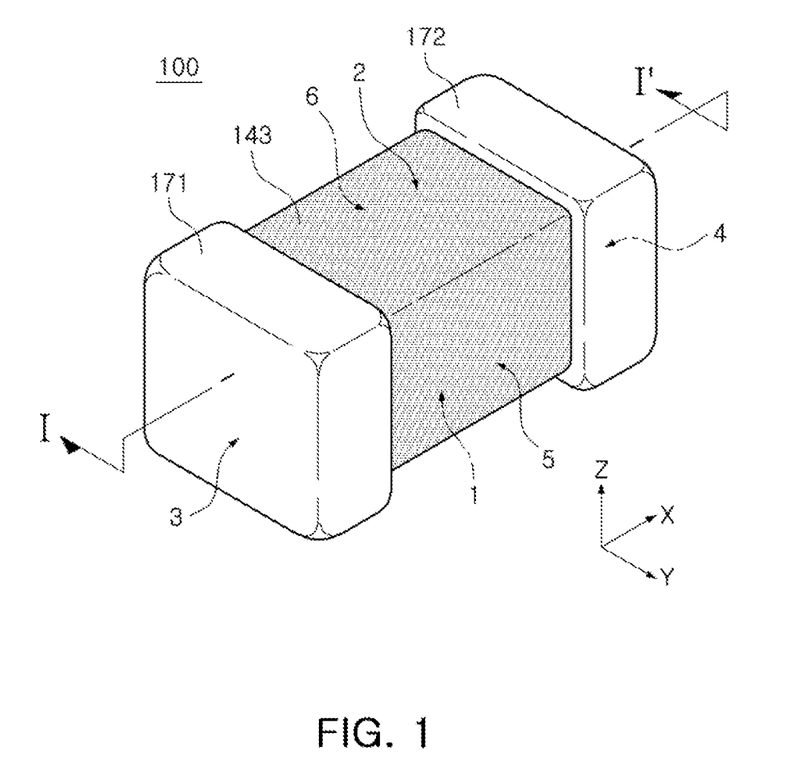
FIG. 1 is a schematic perspective view of a capacitor component according to one exemplary embodiment in the present disclosure.

FIG. 1 is a schematic perspective view of a capacitor component according to an exemplary embodiment.

Figure 2:
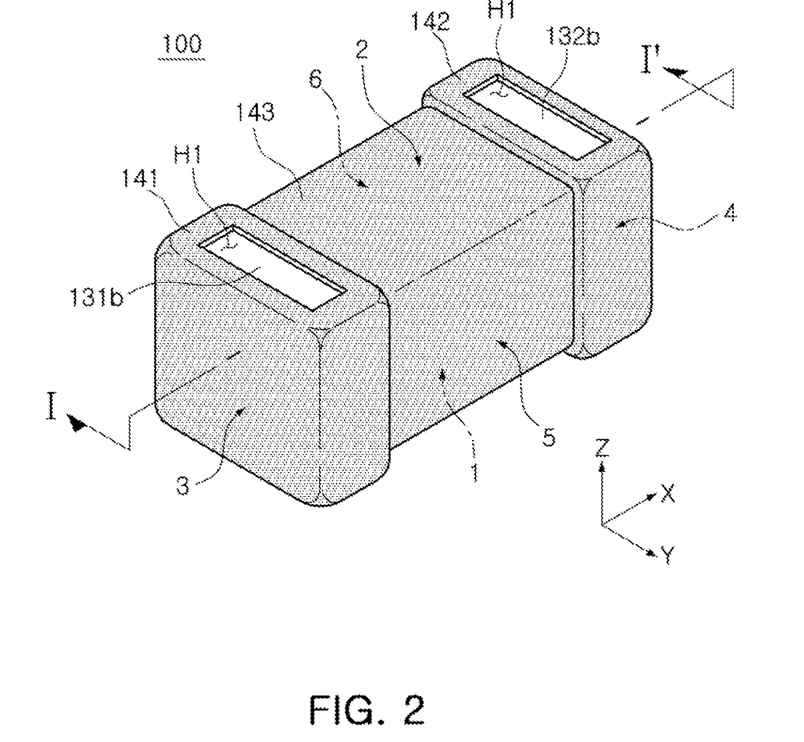
FIG. 2 is a schematic perspective view of a capacitor component shown in FIG. 1, excluding connection electrode layers and plating layers.

FIG. 2 is a schematic perspective view of a capacitor component such as that shown in FIG. 1 but excluding connection electrodes and plating layers.

Figure 3:
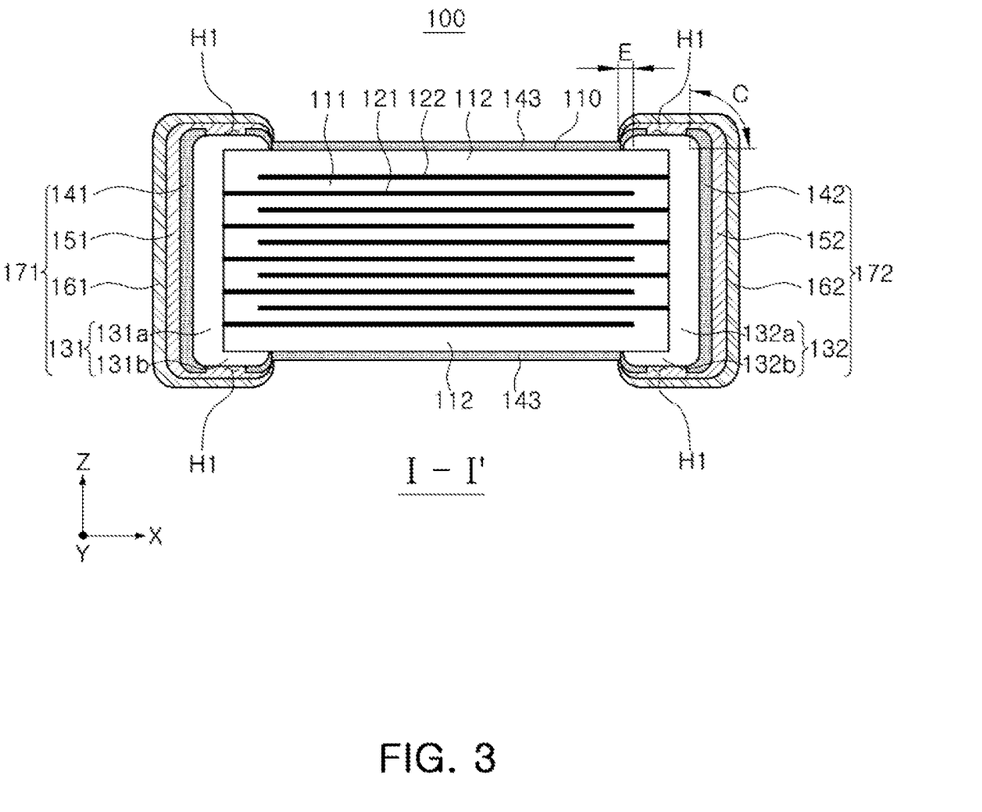
FIG. 3 is a cross-sectional view taken along line I-I' shown in FIG. 1.

FIG. 3 is a cross-sectional view taken along line I-I' shown in FIGS. 1 and 2.

Figure 4A:
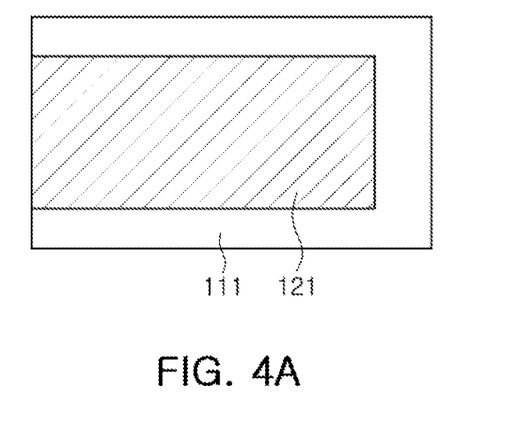
FIGS. 4A and 4B illustrate ceramic green sheets having internal electrodes printed thereon for producing a body of a capacitor component according to one exemplary embodiment in the present disclosure.
Figure 4B:
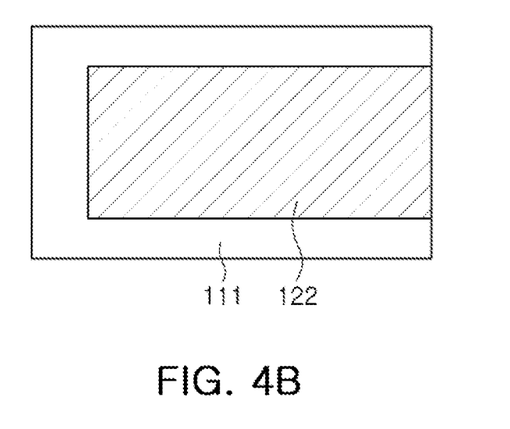

FIG. 4A and FIG. 4B illustrate respective ceramic green sheets each having an internal electrode printed thereon for producing a body of a capacitor component according to an exemplary embodiment.

Hereinbelow, with reference to FIGS. 1 to 3, 4A, and 4B, a capacitor component 100 according to the present exemplary embodiment will be described in detail.

A capacitor component 100 according to the present exemplary embodiment includes a body 110. The body 110 includes dielectric layers 111 and first and second internal electrodes 121 and 122 alternately disposed with dielectric layers 111 interposed therebetween, and has first and second surfaces 1 and 2 opposing each other, third and fourth surfaces 3 and 4 connected to the first and second surfaces 1 and 2 and opposing each other, and fifth and sixth surfaces 5 and 6 connected to the first to fourth surfaces 1, 2, 3, and 4, and opposing each other. A first electrode layer 131 includes a first connection portion 131a disposed on the third surface 3 of the body 110, and a band portion 131b extending onto portions of the first, second, fifth and sixth surfaces 1, 2, 5, and 6 from the first connection portion 131a. A second electrode layer 132 includes a second connection portion 132a disposed on the fourth surface 4 of the body 110, and a band portion 132b extending onto portions of the first, second, fifth and sixth surfaces 1, 2, 5, and 6 from the second connection portion 132a. First and second humidity resistant layers 141 and 142 are disposed on the first and second electrode layers 131 and 132, respectively, and include an opening portion H1 formed on the band portions 131b and 132b, respectively. A third humidity resistant layer 143 is disposed on the first, second, fifth, and sixth surfaces 1, 2, 5, and 6 of the body 110 and connected to the first and second humidity resistant layers 141 and 142. First and second connection electrode layers 151 and 152 are disposed on the first and second humidity resistant layers 141 and 142, respectively, and disposed in contact with the first and second electrode layers 131 and 132, respectively, through the opening portion H1.

The dielectric layers 111 and the internal electrodes 121 and 122 may be laminated alternately in the body 110.

The shape of the body 110 is not limited to any particular shape, and as illustrated, may have a hexahedron shape or a shape similar thereto. Due to shrinkage of a ceramic powder contained in the body 110 during a sintering process, the body 110 may not have a hexahedron shape having completely straight lines/sides, but may have a substantially hexahedron shape.

The body 110 may have first and second surfaces 1 and 2 opposing each other in a thickness direction (a Z direction), third and fourth surfaces 3 and 4 connected to the first and second surfaces 1 and 2 and opposing each other in a length direction (an X direction); and fifth and sixth surfaces 5 and 6 connected to the first and second surfaces 1 and 2, connected to the third and fourth surfaces 3 and 4, and opposing each other in a width direction (an Y direction).

A plurality of dielectric layers 111 forming the body 110 may be in a sintered state, such that boundaries between adjacent dielectric layers may be integrated with each other and may thus be difficult to identify without using a scanning electron microscope (SEM).

The material forming the dielectric layer 111 is not limited to any particular material as long as sufficient capacitance can be obtained therefrom. For example, the material may be barium titanate ($BaTiO_3$) powder particulates. As the material forming the dielectric layer 111, various ceramic additives, organic solvents, plasticizers, binders, dispersing agents, and the like, may be added to powder particulates, such as barium titanate ($BaTiO_3$) powder particulates, according to the purpose of the present disclosure.

In upper and lower portions of the body 110, both end portions of the body 110 in the thickness direction (the Z direction), cover layers 112 may be formed by laminating dielectric layers not having internal electrodes formed therein. The cover layers 112 may serve to maintain the reliability of a capacitor against external impacts.

Next, the internal electrodes 121 and 122 may be disposed alternately with the dielectric layer interposed therebetween, and may include first and second internal electrodes 121 and 122. The first and second internal electrodes 121 and 122 may be alternately disposed, while opposing each other with the dielectric layers 111 forming the body 110 interposed therebetween, and may be exposed to the third and fourth surfaces 3 and 4 of the body 110, respectively.

The first and second internal electrodes 121 and 122 may be alternately exposed to the third surface 3 and the fourth surface 4, both end surfaces in the length direction of the body 110, and may be connected to first and second external electrodes 171 and 172, respectively.

In detail, the first internal electrode 121 may be connected to the first external electrode 171 without being connected to the second external electrode 172, and the second internal electrode 122 may be connected to the second external electrode 172 without being connected to the first external electrode 171. Accordingly, the first internal electrodes 121 may remain spaced apart from the fourth surface 4 by a predetermined distance, and the second internal electrodes 122 may remain spaced apart from the third surface 3 by a predetermined distance.

In detail, the first and second internal electrodes 121 and 122 may be electrically insulated from each other by the dielectric layers 111 interposed therebetween.

The material forming the first and second internal electrodes 121 and 122 is not limited to any particular material. For example, the first and second internal electrodes 121 and 122 may be formed using a conductive paste formed of at least one material selected from nickel (Ni), copper (Cu), and precious metal materials, such as palladium (Pd), palladium-silver (Pd—Ag) alloys, and the like.

The method for printing the conductive paste may be a screen printing method, a gravure printing method, or the like, but is not limited thereto.

Referring to FIG. 4A and FIG. 4B, the body 110 may be formed by alternately laminating a ceramic green sheet a on which the first internal electrode 121 is printed, and a ceramic green sheet b on which the second internal electrode 122 is printed, and sintering the laminated ceramic green sheets.

The external electrodes 171 and 172 may be disposed on the body 110, and may include the electrode layers 131 and 132, the humidity resistant layers 141 and 142, and the connection electrode layers 151 and 152. The external electrodes 171 and 172 may include the first and second external electrodes 171 and 172 connected to the first and second internal electrodes 121 and 122, respectively.

The first electrode layer 131 may include the first connection portion 131a disposed on the third surface 3 of the body 110, and the band portion 131b extending onto portions of the first, second, fifth, and sixth surfaces 1, 2, 5, and 6 of the body 110 from the first connection portion 131a.

The second electrode layer 132 may include the second connection portion 132a disposed on the fourth surface 4 of the body 110, and may include the band portion 132b extending onto portions of the first, second, fifth, and sixth surfaces 1, 2, 5, and 6 of the body 110 from the second connection portion 132a.

The material forming the first and second electrode layers 131 and 132 may be any material having electrical conductivity, such as metal and the like, and may be selected on the basis of properties thereof, such as electrical properties, structural stability, and the like.

For example, the first and second electrode layers 131 and 132 may be sintered electrodes containing glass and a conductive metal, or may be resin-based electrodes containing a base resin and a conductive metal.

In detail, the first and second electrode layers 131 and 132 may be formed by an atomic layer deposition (ALD) technique, a molecular layer deposition (MLD) technique, a chemical vapor deposition (CVD) technique, a sputtering technique, or the like.

When the first and second electrode layers 131 and 132 are sintered electrodes containing glass and a conductive metal, corner portions C in which the connection portions 131a and 132a meet the band portions 131b and 132b, respectively, may be formed to have a small thickness, or end portions E of the band portions 131b and 132b may undesirably separate from the body 110, thus giving rise to humidity resistance reliability issues. Accordingly, when the first and second electrode layers 131 and 132 contain glass and a conductive metal, the effects of improving humidity resistance reliability according to the present disclosure may be achieved more effectively.

The first and second humidity resistant layers 141 and 142 may be disposed on the first and second electrode layers 131 and 132, respectively, and may include the opening portion H1 formed on the band portions 131b and 132b, respectively.

The third humidity resistant layer 143 may be disposed on the first, second, fifth, and sixth surfaces 1, 2, 5, and 6 of the body 110, and may be connected to the first and second humidity resistant layers 141 and 142.

The humidity resistant layers 141, 142, and 143 may serve to block humidity permeation paths, thus improving humidity resistance reliability.

The first and second humidity resistant layers 141 and 142 may prevent humidity from permeating into the body 110 through the external electrodes 171 and 172.

The third humidity resistant layer 143 may serve to seal fine pores or cracks of the body 110, thus preventing humidity from permeating into the body 110 through the external surface of the body 110.

In addition, since the first and second humidity resistant layers 141 and 142, and the third humidity resistant layer 143 may be connected to each other to form a single humidity resistant layer including the humidity resistant layers 141, 142, and 143, so even the humidity permeation paths formed due to separation of the end portions E of the band portions 131b and 132b from the body 110 may be blocked, thus further improving humidity resistance reliability.

In detail, the first to third humidity resistant layers 141, 142, and 143 may be formed by forming the first and second electrode layers 131 and 132 on the body 110 including the dielectric layer 111 and the internal electrodes 121 and 122, thereafter forming a humidity resistant layer of low humidity permeability on the entire external surface thereof, and then, removing portions of the humidity resistant layers 141 and 142 formed on the first and second electrode layers 131 and 132 (e.g., the portions in which the opening portion H1 will be formed).

For example, the humidity resistant layers 141, 142, and 143 may be formed by an ALD technique, a MLD technique, a CVD technique, or the like.

In particular, when the humidity resistant layers 141, 142, and 143 are formed by an ALD technique, and include aluminum oxide ($Al_2O_3$), it may be possible to form the humidity resistant layers 141, 142, and 143 in relatively high density to secure excellent humidity resistance reliability, and to form the humidity resistant layers 141, 142, and 143 in relatively small thickness to increase the effective volume ratio of a capacitor component.

The ALD technique may involve depositing a thin film or a protective film on the surface of a substrate during a semiconductor manufacturing process, and unlike the conventional deposition technique chemically coating a thin film, the ALD technique involves growing the thin film by laminating atomic layers one by one. The ALD technique has advantages in that it provides good step coverage, the thickness of a thin film can be controlled conveniently, and a thin film can be formed uniformly.

In addition, the humidity resistant layers 141, 142, and 143, when formed by the ALD technique using aluminum oxide ($Al_2O_3$), may be able to secure sufficient humidity resistance reliability, even in a relatively small thickness of about 5 nm. Thus, thicknesses of the humidity resistant layers 141, 142, and 143 may be reduced, thus increasing the effective volume ratio of a capacitor component.

The opening portions H1 formed on the band portions 131b and 132b may allow the first and second connection electrode layers 151 and 152 to be in contact with the band portions 131b and 132b of the first and second electrode layers 131 and 132, respectively, through the opening portion H1, and may thereby allow the first and second external electrodes 171 and 172 to be electrically connected to the first and second internal electrodes 121 and 122, respectively.

The opening portions H1 may be formed by forming the first and second electrode layers 131 and 132 on the body 110, thereafter forming a humidity resistant layer (e.g., 141, 142, and 143) of low humidity permeability on the entire external surface thereof, and then removing portions of the humidity resistant layers 141 and 142 formed on portions H1 of the first and second electrode layers 131 and 132.

As a method for removing such portions to form the opening portions H1, for example, a laser machining process, a mechanical polishing process, a dry etching process, a wet etching process, or a shadow deposition process using a tape-protected layer may be used.

The shape of the opening portion H1 is not limited to any particular shape. For example, the opening portion H1 may have a circular shape, a rectangular shape (e.g., as illustratively shown in FIG. 2), an oval shape, a rectangular shape with rounded corners, or the like, and may have an irregular shape.

The opening portion H1 may be formed on a center portion of a band portion (e.g., 131b, 132b) disposed on at least one of the first, second, fifth, and sixth surfaces 1, 2, 5, and 6. In particular, the area of the opening portion H1 may be in the range of 10-90% of the area of the band portion (e.g., 131b, 132b) disposed on the same surface on which the opening portion H1 is formed.

When the area of the opening portion H1 is less than 10% of the area of the band portion disposed on the same surface on which the opening portion H1 is formed, it may be difficult to secure electrical connection. Meanwhile, when the area of the opening portion H1 exceeds 90% of the area of the band portion disposed on the same surface on which the opening portion H1 is formed, humidity resistance reliability may degrade.

In particular, since edges of the band portions 131b and 132b may serve as a main humidity permeation path (e.g., at corner portions C and end portions E), the opening portion H1 may be formed on the center portion of each band portion to further improve humidity resistance reliability.

In particular, at the end portions E of the band portions 131b and 132b, the end portions of the band portions 131b and 132b may undesirably separate from the body 110, and at the corner portions C, where the band portions 131b and 132b meet the first and second connection portions 131a and 132a, respectively, the first and second electrode layers 131 and 132 may be formed in relatively smaller thickness, serving as main humidity permeation paths. Accordingly, the opening portion H1 may not be formed on the end portions E of the band portions 131b and 132b, and may not be formed on the corner portions C in which the band portions 131b and 132b meet the first and second connection portions 131a and 132a, respectively.

The third humidity resistant layer 143 may be formed on the external surface of the body 110, except portions of the external surface of the body 110 in which the first and second electrode layers 131 and 132 are formed. Thus, the permeation of humidity into the body 110 through the external surface of the body 110 may be prevented more effectively.

The first and second humidity resistant layers 141 and 142 may further include opening portions formed on the first and second connection layers 131a and 132a, respectively, to further improve the electrical connection between the external electrodes and the internal electrodes.

The first and second connection electrode layers 151 and 152 may be disposed on the first and second humidity resistant layers 141 and 142, respectively, and may be in contact with the first and second electrode layers 131 and 132, respectively, through the opening portions H1.

In detail, the first and second connection electrode layers 151 and 152 may serve to allow the first and second external electrodes 171 and 172 to be electrically connected to the first and second internal electrodes 121 and 122, respectively. Since it is relatively difficult to form a metal plating layer on the first and second humidity resistant layers 141 and 142, the first and second connection electrode layers 151 and 152, having electrical conductivity, may serve to facilitate the formation of the plating layers.

Meanwhile, the material forming the first and second connection electrode layers 151 and 152 may be any material having electrical conductivity, such as metal and the like, and may be selected on the basis of properties thereof, such as electrical properties, structural stability, and the like.

In addition, the first and second connection electrode layers 151 and 152 may be formed by the same method as the first and second electrode layers 131 and 132 as described above, or by a method different therefrom.

The capacitor component according to the exemplary embodiment may further include first and second plating layers 161 and 162 disposed on the first and second connection electrode layers 151 and 152, respectively. The first and second plating layers 161 and 162 may serve to improve mounting characteristics.

The first and second plating layers 161 and 162 may be a Ni-plating layer or a Sn-plating layer, and may be formed by sequentially forming an Ni-plating layer and an Sn-plating layer on the first and second connection electrode layers 151 and 152, respectively, and may include a plurality of Ni-plating layers and/or a plurality of Sn-plating layers.

Hereinbelow, capacitor components according to another exemplary embodiment and yet another exemplary embodiment in the present disclosure will be described.

In the following, the description of the elements which are the same as the capacitor component 100 according to the aforementioned exemplary embodiment will be omitted to avoid redundancy.

Figure 5:
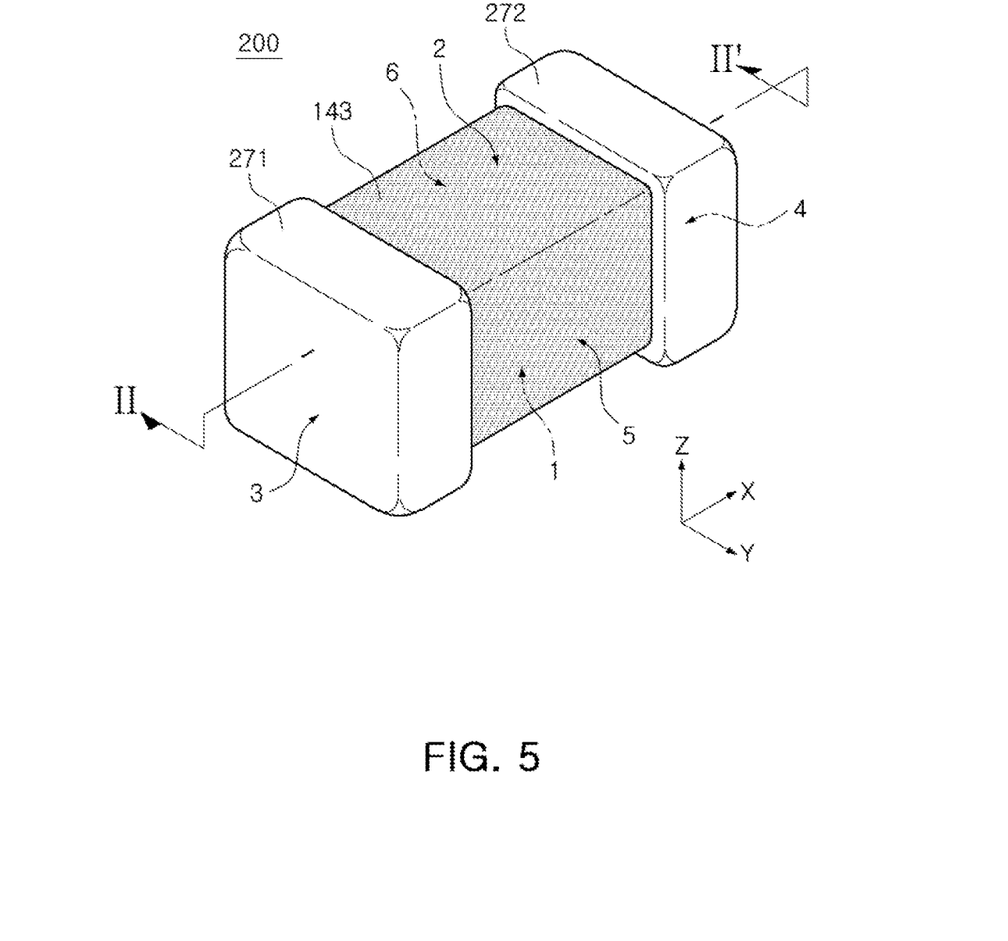
FIG. 5 is a schematic perspective view of a capacitor component according to another exemplary embodiment in the present disclosure.
Figure 6:
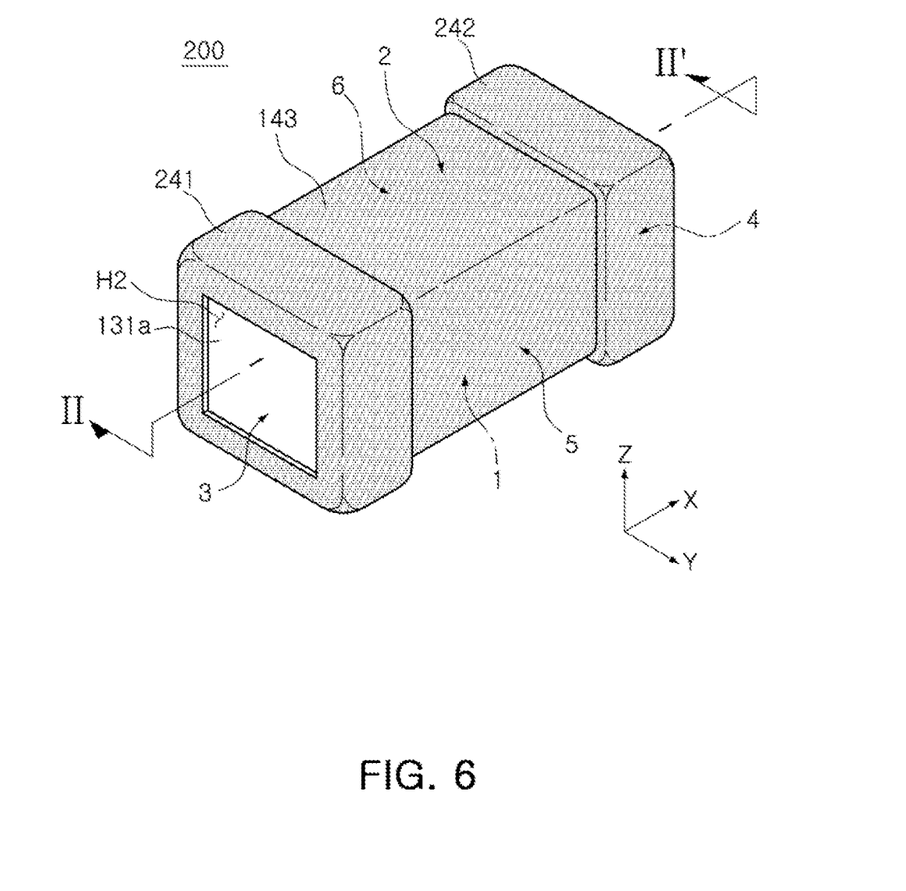
FIG. 6 is a schematic perspective view of a capacitor component shown in FIG. 5, excluding connection electrode layers and plating layers.
Figure 7:
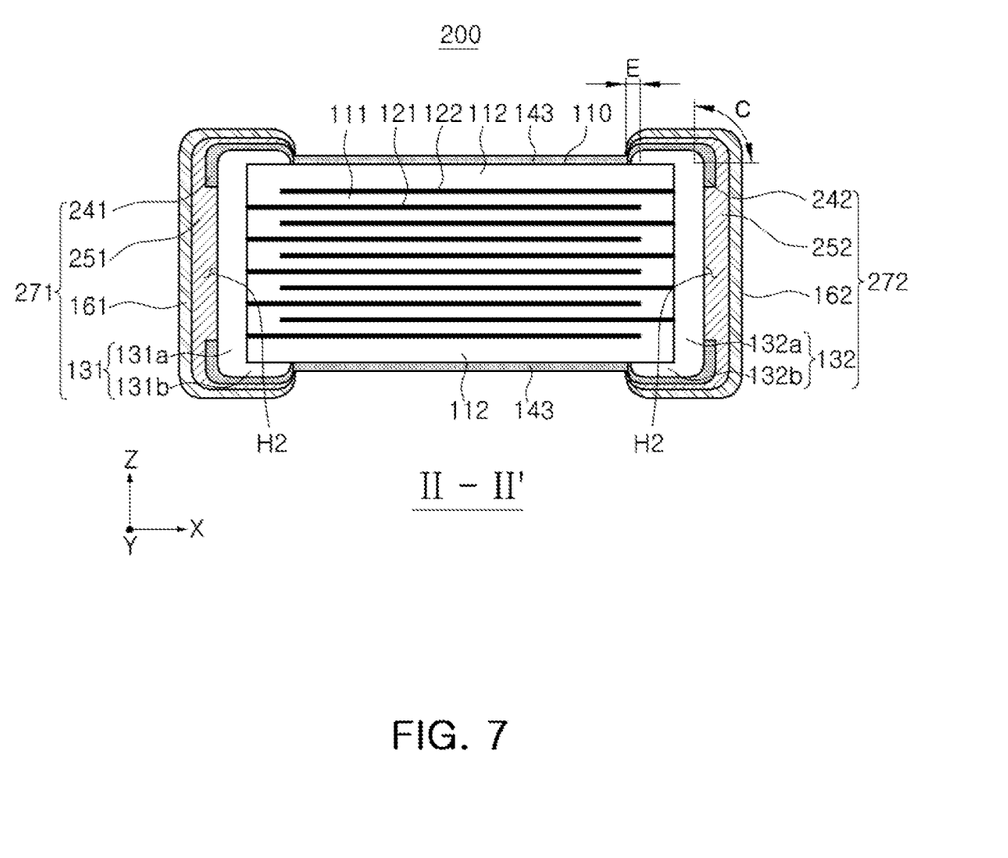
FIG. 7 is a cross-sectional view taken along line II-II' shown in FIG. 5.

FIG. 5 is a schematic perspective view of a capacitor component according to another exemplary embodiment. FIG. 6 is a schematic perspective view of FIG. 5, excluding connection electrode layers and plating layers. FIG. 7 is a cross-sectional view taken along line II-II' shown in FIGS. 5 and 6.

Referring to FIGS. 5, 6, and 7, first and second humidity resistant layers 241 and 242 may be provided in a capacitor component 200 according to the present exemplary embodiment. Additionally, opening portions H2 may be formed not in band portions 131b and 132b, but only in first and second connection portions 131a and 132a.

The first and second connection electrode layers 251 and 252 may be disposed on the first and second humidity resistant layers 241 and 242, respectively, and may be in contact with the first and second connection portions 131a and 132a through the opening portions H2.

Since each of the first and second connection portions 131a and 132a has an area larger than an area of the band portions 131b and 132b, respectively, a process for forming the opening portions H2 therein may be more convenient.

The opening portion H2 may be formed by forming the first and second electrode layers 131 and 132 on the body 110 including internal electrodes, forming a humidity resistant layer of low humidity permeability on the external surface thereof, and removing portions of the humidity resistant layer formed on the first and second electrode layers.

As the method for removing the portions to form the opening portions H2, for example, a laser machining process, a mechanical polishing process, a drying etching process, a wet etching process, a shadow deposition process using a tape-protected layer, or the like, may be used.

The shape of the opening portion H2 is not limited to any particular shape. For example, the opening portion H2 may have a circular shape, a rectangular shape, an oval shape, a rectangular shape with rounded corners, or the like, and may have an irregular shape.

The opening portion H2 may be disposed in a center portion of each of the first and second connection portions 131a and 132a, and an area of the opening portion H2 may be in the range of 10-90% of an area of each of the first and second connection portions 131a and 132a.

When the area of the opening portion H2 is less than 10% of an area of each of the first and second connection portions 131a and 132a, it may be difficult to secure electrical connection. However, when the area of the opening portion H2 exceeds 90% of an area of each of the first and second connection portions 131a and 132a, humidity resistance reliability may degrade.

Edges of the first and second connection portions 131a and 132a may form corner portions C in which the first and second connection portions 131a and 132a meet the band portions 131b and 132b, respectively, and since the first and second electrode layers 131 and 132 may be formed in relatively small thickness in the corner portions C, the corner portions C may serve as main humidity permeation paths.

Accordingly, the opening portion H2 may be formed on a center portion of each of the first and second connection portions 131a and 132a to further improve humidity resistance reliability and to thereby be spaced apart from the corner portions C.

Figure 8:
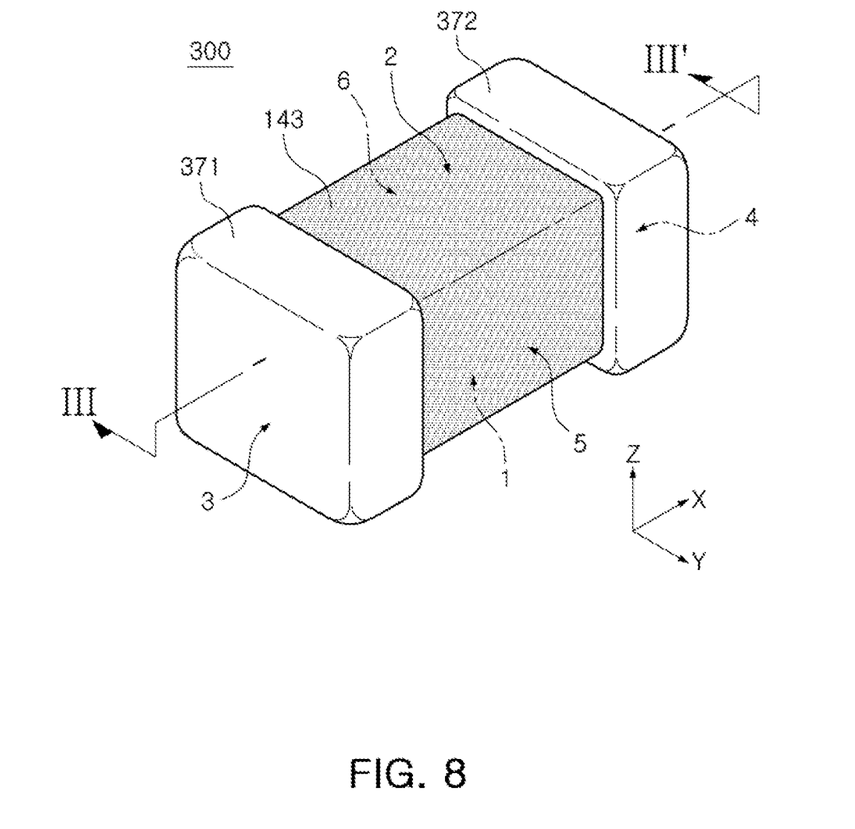
FIG. 8 is a schematic perspective view of a capacitor component according to yet another exemplary embodiment in the present disclosure.

FIG. 8 is a schematic perspective view of a capacitor component according to yet another exemplary embodiment.

Figure 9:
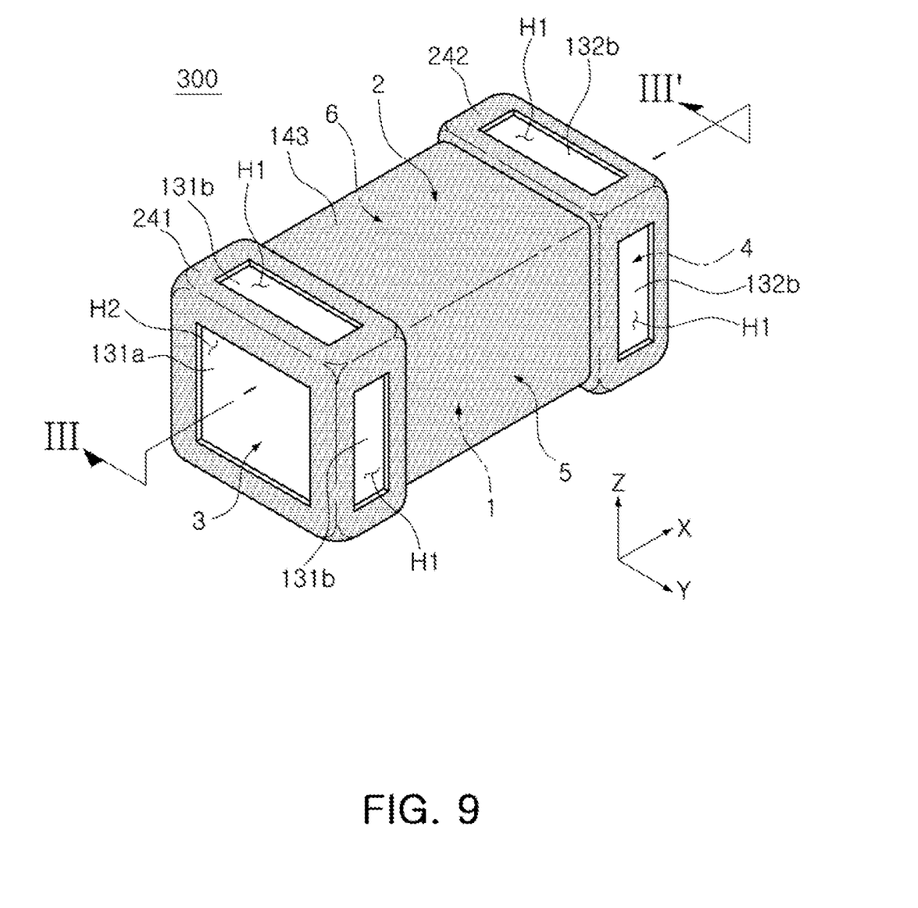
FIG. 9 is a schematic perspective view of a capacitor component shown in FIG. 8, excluding connection electrode layers and plating layers.
Figure 10:
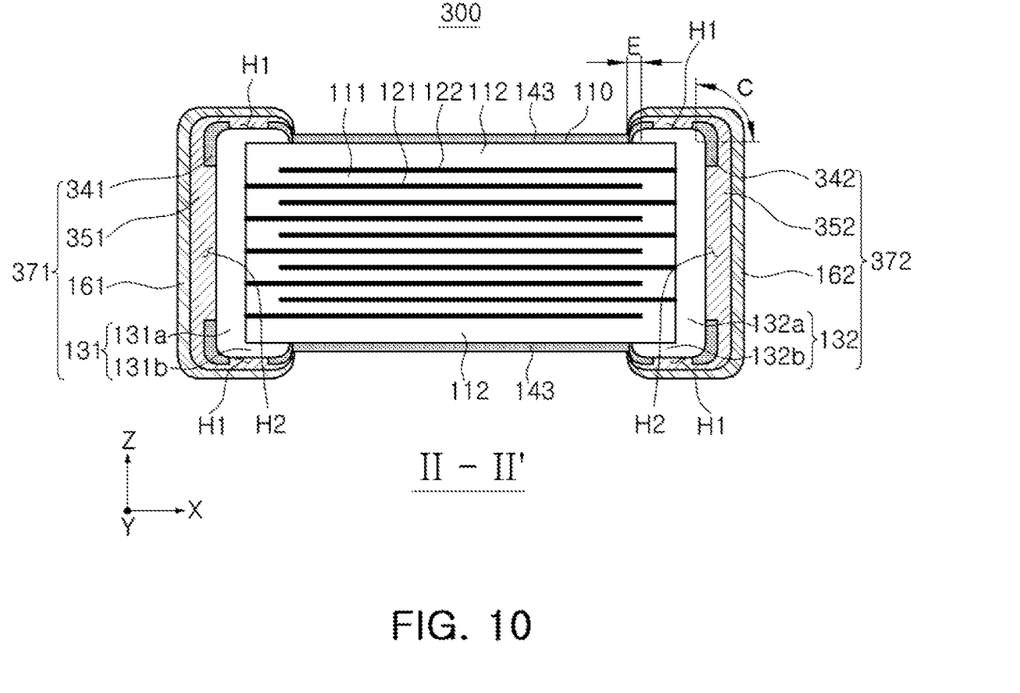
FIG. 10 is a cross-sectional view taken along line III-III' shown in FIG. 8.

FIG. 9 is a schematic perspective view of the capacitor of FIG. 8, excluding connection electrode layers and plating layers. FIG. 10 is a cross-sectional view taken along line III-III' shown in FIGS. 8 and 9.

Referring to FIGS. 8, 9, and 10, first and second humidity resistant layers 341 and 342 are provided on a capacitor component 300 according to the present exemplary embodiment. Additionally, an opening portion H2 may be formed in the first and second humidity resistant layers 341 and 342 on a center portion of each of first and second connection portions 131a and 132a, and in addition, an opening portion H1 may be further formed in the first and second humidity resistant layers 341 and 342 on a center portion of each of band portions 131b and 132b disposed on all of the first, second, fifth and sixth surfaces.

First and second connection electrode layers 351 and 352 may be disposed on the first and second humidity resistant layers 341 and 342, respectively, and may be disposed in contact with the first and second electrode layers 131 and 132 through the opening portions H1 and H2, respectively.

In detail, the opening portions H1 and H2 may be formed on all areas of the first and second electrode layers 131 and 132 except the edges of the band portions 131b and 132b and the edges of the connection portions 131a and 132a, which may serve as main humidity permeation paths, to secure humidity resistance reliability while maximizing the electrical connection between external electrodes 371 and 372 and internal electrodes 121 and 122.

According to the embodiments disclosed herein, a capacitor component may include a humidity resistant layer formed on a portion of the external surface of a body on which the external electrode is not formed, and may further include a humidity resistant layer disposed within the external electrode to improve humidity resistance reliability.

In addition, a portion of the humidity resistant layer disposed within the external electrode may be removed to form an opening portion to improve electrical connection.

Hereinabove, the present disclosure has been described with reference to exemplary embodiments and the accompanying drawings. However, the present disclosure is not limited by the aforementioned exemplary embodiments and the accompanying drawings, but by the appended claims.

Accordingly, it should be understood that various modifications and alterations may be made by those skilled in the art to which the present disclosure pertains without departing from the scope of the present disclosure defined by the appended claims.

What is claimed is:

1. A capacitor component comprising:
    a body including dielectric layers and first and second internal electrodes alternately disposed with the dielectric layers interposed therebetween, and having first and second surfaces opposing each other, third and fourth surfaces connected to the first and second surfaces and opposing each other, and fifth and sixth surfaces connected to the first to fourth surfaces and opposing each other;
    a first electrode layer including a first connection portion disposed on the third surface of the body, and a first band portion extending onto portions of the first, second, fifth, and sixth surfaces of the body from the first connection portion;

a second electrode layer including a second connection portion disposed on the fourth surface of the body, and a second band portion extending onto portions of the first, second, fifth, and sixth surfaces of the body from the second connection portion;

first and second humidity resistant layers disposed on the first and second electrode layers, respectively, and having opening portions formed on the first and second band portions, respectively;

a third humidity resistant layer disposed on the first, second, fifth, and sixth surfaces of the body, connected to the first and second humidity resistant layers, and disposed on at least a portion of the first, second, fifth, or sixth surface of the body free of the first and second electrode layers; and first and second connection electrode layers disposed on the first and second humidity resistant layers, respectively, and disposed in contact with the first and second electrode layers, respectively, through the opening portions.

2. The capacitor component of claim 1, wherein the first, second, and third humidity resistant layers are formed by an atomic layer deposition (ALD) technique, a molecular layer deposition (MLD) technique, or a chemical vapor deposition (CVD) technique.

3. The capacitor component of claim 1, wherein the first, second, and third humidity resistant layers include aluminum oxide ($Al_2O_3$).

4. The capacitor component of claim 1, wherein the first, second, and third humidity resistant layers are formed by an ALD technique and contain aluminum oxide ($Al_2O_3$).

5. The capacitor component of claim 1, wherein the first and second electrodes contains metal particles and glass.

6. The capacitor component of claim 1, wherein each of the opening portions has a rectangular or circular shape.

7. The capacitor component of claim 1, wherein the opening portions are each formed on a center portion of the first or second band portion disposed on the first, second, fifth, or sixth surfaces, and an area of each opening portion is in the range of 10-90% of an area of the first or second band portion disposed on the surface on which the opening portion is formed.

8. The capacitor component of claim 1, wherein the opening portions are not formed on end portions of the band portions and on corner portions in which the band portions meet each of the first and second connection portions.

9. The capacitor component of claim 1, wherein the third humidity resistant layer is formed on all portions of the external surface of the body in which the first and second electrode layers are not formed.

10. The capacitor component of claim 1, wherein the first and second humidity resistant layers further include opening portions formed on the first and second connection portions, respectively.

11. The capacitor component of claim 1, further comprising first and second plating layers disposed on the first and second connection electrode layers, respectively.

12. The capacitor component of claim 11, wherein the first and second plating layers include a Ni-plating layer and a Sn-plating layer disposed on the Ni-plating layer.

13. The capacitor component of claim 1, wherein the first and second humidity resistant layers integrally cover the first and second connection portions, respectively.

14. The capacitor component of claim 1, wherein the third humidity resistant layer extends from the first humidity resistant layer disposed on the first electrode layer to the second humidity resistant layer disposed on the second electrode layer.

15. A capacitor component comprising:

a body including a dielectric layers and first and second internal electrodes alternately disposed with the dielectric layers interposed therebetween, and having first and second surfaces opposing each other, third and fourth surfaces connected to the first and second surfaces and opposing each other, and fifth and sixth surfaces connected to the first to fourth surfaces and opposing each other;

a first electrode layer including a first connection portion disposed on the third surface of the body, and a first band portion extending onto portions of the first, second, fifth, and sixth surfaces of the body from the first connection portion;

a second electrode layer including a second connection portion disposed on the fourth surface of the body, and a second band portion extending onto portions of the first, second, fifth, and sixth surfaces of the body from the second connection portion;

first and second humidity resistant layers disposed on the first and second electrode layers, respectively, and having opening portions formed on the first and second connection portions, respectively;

a third humidity resistant layer disposed on the first, second, fifth, and sixth surfaces of the body, connected to the first and second humidity resistant layers, and disposed on at least a portion of the first, second, fifth, or sixth surface of the body free of the first and second electrode layers; and first and second connection electrode layers disposed on the first and second humidity resistant layers, respectively, and disposed in contact with the first and second electrode layers, respectively, through the opening portions.

16. The capacitor component of claim 15, wherein the opening portion is formed on a center portion of each of the first and second connection portions, and an area of the opening portion may be in the range of 10-90% of an area of each of the first and second connection portions.

17. The capacitor component of claim 15, wherein the first and second humidity resistant layers integrally cover the first and second band portions, respectively.

18. The capacitor component of claim 15, wherein the third humidity resistant layer extends from the first humidity resistant layer disposed on the first electrode layer to the second humidity resistant layer disposed on the second electrode layer.

19. A capacitor component comprising:

a body including dielectric layers and first and second internal electrodes alternately disposed with the dielectric layers interposed therebetween, wherein the first and second internal electrodes are exposed to opposing first and second surfaces of the body, respectively;

a first electrode layer including a first connection portion disposed on the first surface of the body, and a first band portion extending from the first connection portion onto portions of side surfaces of the body;

a second electrode layer including a second connection portion disposed on the second surface of the body, and a second band portion extending from the second connection portion onto portions of the side surfaces of the body;

a first humidity resistant layer disposed on the first connection portion and on the first band portion of the first electrode layer and having one or more opening portions disposed in only one from among the first connection portion and the first band portion;

a second humidity resistant layer disposed on the second connection portion and on the second band portion of the second electrode layer and having one or more opening portions disposed in only one from among the second connection portion and the second band portion; and first and second connection electrode layers disposed on the first and second humidity resistant layers, respectively, and disposed in contact with the first and second electrode layers, respectively, through the opening portions, wherein each of the one or more opening portions does not contact corner portions of the first and second electrode layers in which the first and second band portions meet the respective first and second connection portions.

20. The capacitor component of claim 19, wherein each of the opening portions has a rectangular shape.

21. The capacitor component of claim 19, wherein the first humidity resistant layer includes no more than one opening portion on each side surface of the body having the first band portion thereon, and the second humidity resistant layer includes no more than one opening portion on each side surface of the body having the second band portion thereon.

22. The capacitor component of claim 19, wherein the first humidity resistant layer includes only one opening portion, and the only one opening portion is disposed in the first connection portion, and the second humidity resistant layer includes only one opening portion, and the only one opening portion is disposed in the second connection portion.

23. The capacitor component of claim 19, wherein the opening portions disposed in the first and second humidity resistant layers are spaced apart from all edges of the first and second electrode layers.

24. The capacitor component of claim 19, further comprising a third humidity resistant layer connected to each of the first and second humidity resistant layers and disposed on at least a portion of the external surfaces of the body free of the first and second electrode layers.

* * * * *